United States Patent [19]

Rasmussen et al.

[11] 3,884,270

[45] May 20, 1975

[54] METHOD FOR PRODUCING FLEXIBLE REGENERATED CELLULOSIC TUBING AND THE TUBING OBTAINED THEREFROM

[75] Inventors: Jerome Jordan Michael Rasmussen, South Stickney Twp.; David Vou, Park Forest, both of Ill.

[73] Assignee: Union Carbide Corporation, New York, N.Y.

[22] Filed: Mar. 14, 1974

[21] Appl. No.: 451,114

Related U.S. Application Data

[63] Continuation of Ser. No. 337,109, March 1, 1973, which is a continuation of Ser. No. 197,158, Nov. 1, 1971, abandoned, which is a continuation-in-part of Ser. No. 789,350, Jan. 6, 1969, abandoned.

[52] U.S. Cl. ............. 138/177; 106/168; 138/118.1; 264/41
[51] Int. Cl. ..................... C08b 21/20; F16l 11/02
[58] Field of Search..................... 106/168; 138/177

[56] References Cited

UNITED STATES PATENTS

| 2,077,699 | 4/1937 | Kline | 106/168 |
| 3,431,127 | 3/1969 | Baetzel | 106/168 |
| 3,591,667 | 7/1971 | Kulshrestha | 106/168 |
| 3,674,523 | 7/1972 | Rose | 106/168 |

*Primary Examiner*—Theodore Morris
*Attorney, Agent, or Firm*—Franklyn Schoenberg

[57] ABSTRACT

Improved flexibility and pliancy and the ability to be readily opened are characteristics and properties imparted to regenerated cellulosic tubing by incorporating a softening and anti-block additive in the viscose solution before the viscose solution is extruded into tubular form and further processed.

3 Claims, No Drawings

METHOD FOR PRODUCING FLEXIBLE REGENERATED CELLULOSIC TUBING AND THE TUBING OBTAINED THEREFROM

This is a continuation of application Ser. No. 337,109 filed Mar. 1, 1973, which application was filed under Rule 60 and in turn was a continuation of application Ser. No. 197,158, filed Nov. 1, 1971, now abandoned, which in turn was a continuation-in-part of application Ser. No. 789,350, filed Jan. 6, 1969, now abandoned. This invention relates to a method for producing flexible regenerated cellulosic tubing which exhibits non-blocking characteristics.

The tubing to which this invention relates can be employed, for example, as food casings for packaging and/or processing processed foods such as sausages, bolognas, cheese products and the like and as dialysis membranes in such applications as artificial kidney machines.

The term "dialysis membrane" is intended to refer to and should be understood as referring to semi-permeable membranes that exhibit differential filtering characteristics of molecular sized particles. Dialysis membranes are typically employed in ultra fine filtration processes wherein particles falling within a specified molecular-sized range are permitted to pass through the membrane while particles outside this range are restrained.

Regenerated cellulosic tubing may be produced to exhibit different characteristics for the types of end uses contemplated. For example, various types of coating may be applied to regenerated cellulosic tubing such as is disclosed and described in Shiner et al. U.S. Pat. No. 3,378,379, Chiu et al. U.S. Pat. No. 3,307,956, and Underwood et al. U.S. Pat. No. 2,961,323 and tubing may be prepared from viscose compositions having incorporated therein various additives such as is described in Henderson U.S. Pat. No. 1,654,253 and Baetzel et al. U.S. Pat. No. 3,431,127. It can be seen, therefore, that regenerated cellulosic tubing can be produced which will exhibit one or more of those properties desired or required by the user or processor.

When utilized in the processed food industry or as dialysis membranes, regenerated cellulosic tubing is normally supplied in a flattened condition. Due to a tendency of the tubing to block, that is, when in the flattened condition, the surfaces of the inner walls of the tubing tend to adhere to each other, a problem is encountered wherein the tubing cannot be readily opened.

Attempts to stuff flattened regenerated cellulosic food casings with a food product have not been commerically acceptable since they cannot be readily opened from a flattened state to tubular form, nor do they exhibit sufficient flexibility to enable them to be gathered onto a stuffing horn or to readily conform to the forces and pressures exerted during stuffing and closing operations. The difficulties encountered in dialysis membrane applications are even more pronounced because, in general the cellulosic tubing employed has a thinner wall thickness and is therefore more delicate and susceptible to tearing and other types of damage.

It is an object of this invention to provide a method for producing regenerated cellulosic tubing that exhibits increased flexibility and improved anti-blocking characteristics.

This and further objects of the invention will become more apparent from the ensuing description.

It has been found that the objects of the invention can be generally attained by incorporating a softening and anti-block additive in the viscose solution before the cellulose in the viscose solution is further processed so that there is obtained a flexible, regenerated cellulosic tubing exhibiting improved anti-blocking characteristics.

A typical process of producing regenerated cellulosic tubing, includes the steps of continuously extruding a viscose solution to form a tubular configuration and then coagulating and regenerating the cellulose in the tubular configuration. To obtain the flexible tubing of the invention, the softening and antiblock additive is added to the viscose solution before it is extruded. In this manner, the softening and anti-block additive can be incorporated and cast in situ into the wall of the regenerated cellulosic tubing and will not interfere with nor adversely affect the application, anchoring or functioning of coatings such as a moisture-proof gas barrier coating on the outer wall of the casing.

In addition to imparting flexibility to a regenerated cellulosic tubing the softening anti-block additive should also exhibit low or negligible extraction from the wall of the regenerated cellulosic casing and be capable of imparting slip and anti-block properties to the inner wall of the casing. Preferably the softening anti-block additive should be suitable for use with food items, and where necessary, for biomedical applications.

It has been found that the softening anti-block additive which can be employed to impart the properties and characteristics discussed above and which will also be effective to impart flexibility to regenerated cellulosic tubing can be a fatty acid ester of a polyhydric alcohol.

The fatty acid esters that can be employed are fully esterified esters of polyhydric alcohols and fat-forming fatty acids derived from natural or synthetic sources. The esters can be used in their pure state or in the form of their technical grades which are usually commercially available in the form of liquids, oils, soft masses or firm masses, and preferably are normally liquid or have a melting point below about 100°F. The esters can have a single fatty acid or can have a mixture of fatty acids such as are obtained from fish and vegetable oils, animal fats and the like.

The term "fatty acid," as used herein, is definitive of those fat-forming fatty acids present as such or as glycerides in natural fats. The Yearbook of Agriculture, 1959 Food, U.S. Department of Agriculture, page 716, defines "fat" as follows: "A glyceryl ester of fatty acids. Fats generally are substances of plant and animal origin. Fat may be in solid form, as butter, margarine, or other shortening, or in liquid form, as the vegetable oils."

Preferably, such acids contain from about 8 to 22 carbon atoms and can be saturated or unsaturated such as stearic, oleic, myristic, lauric, ricinoletic, behenic, and the like, as well as mixtures thereof. The alcohols used to form the esters are the polyhydric alcohols such as diethylene glycol, propylene glycol, polyoxyethylene glycols, glycerol, sorbitol, mannitol and the like.

In one embodiment of the invention, the softening anti-block additive is homogeneously incorporated into the viscose solution containing cellulose. According to techniques well known to those skilled in the art, the viscose solution is then extruded into tubular form and cellulose in the viscose is regenerated so that the softening anti-block additive is cast in the cellulose in situ. The tubular structure is subsequently washed, desulfured, passed through glycerine baths and dried to obtain a tubular, regenerated cellulosic casing.

The amount of softening anti-block additive that can be employed to impart the desired properties and characteristics to a regenerated cellulosic tubing is preferably from about 0.1 percent to 2.5 percent by weight based upon the bone dry weight of cellulose in the viscose solution through amounts of additive up to about 14 percent by weight based on the bone dry weight of cellulose in the viscose solution can be used.

In the preferred embodiment of the invention, castor oil or vegetable oils are employed as the softening anti-block additive.

The invention is further illustrated by the following examples. Unless otherwise indicated, all parts and percentages are by weight.

EXAMPLE I

Approximately 600 feet each of six different types of regenerated cellulosic casings were fabricated according to the general process of extruding a viscose solution into a tubular configuration followed by coagulation and regeneration of the cellulose in the tubular configuration to produce tubular casings. In addition, all of the tubular casings were also glycerinated in the usual manner to soften them by passing them through glycerine dip tanks.

The glycerine content in the six types of casing, each being 1.8 mil in thickness and 2.75 inches in flat width, was varied by adjusting the number of dips to which each casing was subjected in the glycerine tanks. Thus, the glycerine softener content of the casings was varied from about 35 to 50 percent glycerine to dry cellulose by weight to demonstrate that adhesion of the moistureproof-gas barrier coating was adversely affected as the glycerine content of the casing was increased.

Castor oil was employed as the softening-antiblock additive and the amount of castor oil blended into the viscose solution was also varied for each casing produced.

Each casing was also coated with a moistureproof-gas barrier coating consisting essentially of vinylidene chloride copolymer and was applied according to presently employed procedures such as is disclosed and described in the U.S. patent to Underwood et al. identified hereinabove.

The castor oil was blended into the viscose solution in the form of an emulsion containing 10 percent by weight castor oil. The emulsion was comprised of 600 grams castor oil, 5,275 grams distilled water and 125 grams of a commercially available dispersing agent whose major constituent was a sodium salt of a sulfated methyloleate. Although this particular dispersing agent was selected, it should be understood that the type of dispersing agent employed to form the emulsion is not critical and that other commercially available dispersing agents or surfactants can also be employed.

The emulsion was prepared by recirculating the castor oil, water and dispersing agent in four passes through a Gaulin homogenizer at 2,500 p.s.i. The resultant 10 percent castor oil emulsion was then incorporated into a 7.5 percent cellulose content viscose solution by means of a conventional metering pump and the mixture was then blended in a pigment mixer. The viscose was extruded into a tubular configuration by employing a 1¾ inch diameter annular die and a 1.205 inch diameter mandrel 50 inches long at a rate of 22 feet per minute.

The amount of castor oil added to the viscose solution, and the total glycerine content in each casing is set forth in Table I below wherein letters A–F, inclusive, identify each of the six different types of casings produced.

Samples of each of the six casing produced (A–F) were tested for internal blocking on an Instron tensile tester. In this instance, the blocking of the casings was a measure of the affinity that one surface of the casing exhibited for another surface of the casing when that casing was in a flattened condition; that is, the internal blocking characteristics of the casings.

The ability to apply the moistureproof-gas barrier coating to the casings was also gauged and the results determined by assigning an arbitrary rating to each casing of "excellent," "fair" and "poor" signifying the ability to completely adhere the coating to the casing ("excellent"), the ability to adhere only part of the coating to the casing ("fair") and the inability to adhere any part of the coating to the casing ("poor").

The results of determining the internal blocking and the ability to adhere the moistureproof-gas barrier coating to the casings are also set forth in Table I below.

TABLE I

| Casing | % Castor Oil Added Based on Bone Dry Weight of Cellulose in Viscose Solution | Concentration of Softener in Tubing (% glycerine added to Cellulose | Ability of Coating to Adhere to Casing | Internal Blocking of Casing |
|---|---|---|---|---|
| A | 0 | 35.9 | Excellent | Blocked |
| B | 0 | 50.7 | Poor | Blocked |
| C | 2.5 | 36.4 | Excellent | None |
| D | 5.0 | 35.8 | Excellent | None |
| E | 5.0 | 55.2 | Excellent | None |
| F | 0.5 | 45.4 | Excellent | None |

During processing, it was found difficult to apply the moisture-proof gas barrier coating to casings A and B due to internal blocking or these casings. As a result, air inside the tubing was not permitted to pass freely along the casing length causing air to accumulate at rollers, nip points and the like producing creases and folds in the casing. In addition the high glycerine content of casing B (50.7 percent) interfered with the ability of the moisture-proof gas barrier coating to adhere to it. However, even though casing E had a higher glycerine content (55.2 percent) than casing B, no difficulty was encountered in adhering the moisture-proof gas barrier coating to it.

Samples of each of the six types of casings identified in Table I above were subjected to a food stuffing test. Liver sausage was selected as the food emulsion with which to stuff the casings since liver sausage is quite sensitive to oxygen and could, therefore, be used as a means to determine the barrier properties of the moisture-proof gas barrier coating on the casings. The moisture-gas barrier properties of the casings were determined by the loss in product weight which each stuffed casing exhibited.

The casing samples were manually stuffed in both the dry and wet condition. The wet casings were wetted by opening them and filling them with water in order to soak them. All the casing samples were closed at their last stuffed ends by use of string ties, plastic coated clips and metal clips. In addition, casing E was also shirred on a semi-automatic shirring apparatus in a dry condition and was then stuffed in both the dry and wet condition.

It was found that the casings which were wetted were subjected to more last closure breakage and could not be closed at all with a metal clip. Conversely, all the casings which were not wetted withstood all three types of closures.

The moisture-proof gas barrier properties of all the casings were comparable indicating that the presence of castor oil does not adversely affect these properties of the casings. In this regard, it is interesting to note that, when shirred, casing E also exhibited moisture-gas barrier properties equal to the other casings indicating that its moisture-proof gas barrier coating was not damaged during shirring. Additionally, all the stuffed casings exhibited comparable product weight loss which, in all instances, was negligible.

When a casing having a moisture-proof gas barrier coating was to be presoaked prior to being stuffed so that it could be handled in a flexible manner, such as by gathering the casing onto a stuffing horn, it was found difficult to open the casing so that it could be soaked since the casing was blocked. Surprisingly, it was found that when from about 0.1 percent to 2.5 percent of a fatty acid ester was incorporated into the cellulose containing viscose solution in the manner described hereinabove, these casings exhibited virtually no blocking.

It was also found that amounts of a fatty acid ester up to about 14 percent can be incorporated into the cellulose containing viscose solution without adversely affecting the application and adhesion of a moisture-proof gas barrier coating to the casing obtained.

It can be seen, therefore, that fatty acid esters, such as those obtained from vegetable oils and animal fats, can be utilized to impart both anti-blocking and flexibility properties to regenerated cellulosic casings including casings having a moisture-proof gas barrier coating. Further, the regenerated cellulosic casings can be produced from viscose solutions containing from about 5 percent to 14 percent dry weight cellulose; preferably, from about 5 percent to 8 percent dry weight cellulose.

EXAMPLE II

Approximately 1,200 feet each of two different regenerated cellulosic tubular dialysis membranes were prepared according to the general process of extruding a viscose solution into a tubular configuration followed by coagulation and regeneration of the cellulose. After regeneration the cellulosic tubing was washed and glycerinated in the usual manner, dried in the inflated state to a moisture content of about 10 percent and then wound on a core in a flattened condition.

The following regenerated cellulosic tubing was prepared:

Tubing A: prepared from a viscose solution containing 6.3 percent by weight of cellulose.

Tubing B: prepared from a viscose solution containing 6.3 percent by weight of cellulose and based on the weight of cellulose, 1.0 percent weight of castor oil. Castor oil was employed as the softening anti-block additive in the viscose composition from which Tubing B was prepared. The castor oil was incorporated in the viscose solution in the form of an emulsion containing 7.1 parts by weight of castor oil, 92.5 parts by weight of water and 0.4 parts by weight of the commercially available surfactant sodium dioctyl sulfosuccinate.

Tubing A and B both had a dry wall of 0.0005 inch ± 0.00005 inch and a dry flat width of 1.75 inches ± 0.05 inch. The blocking and permeation properties of Tubing A and B were determined and are summarized in Table II below.

Table II

|  | Permeation Properties (Avg.) | | Blocking |
|---|---|---|---|
|  | WPR | VPR |  |
| Tubing A | 815 | 19 | Yes |
| Tubing B | 875 | 19 | No |

WPR — Water permeation rate, gm $H_2O/100$ in$^2$/24 hrs. at 441 mm Hg based pressure.

VPR — Urea permeation rate, gms Urea/100 in$^2$/24 hrs. based on retentate urea concentration of 750 parts per million.

The use of castor oil as a softening anti-block additive in viscose solutions from which regenerated cellulosic dialysis membrane tubing was to be fabricated significantly improved the blocking properties of the tubing produced (Tubing B) while no significant difference was found in the permeation properties of the membrane.

Although the invention has been described in some detail and with particularity, it should be understood that changes, modifications and alterations can be made therein, in addition to those described and suggested, without departing from the scope and spirit of the invention.

What is claimed is:

1. In a method for producing an improved regenerated cellulosic tubing the improvement which comprises the step of homogeneously incorporating into a viscose solution from which the regenerated cellulosic tubing is to be formed, an amount of from about 0.5 percent to 2.5 percent by weight based upon the dry weight of cellulose in the viscose solution of a softening anti-block additive said additive being castor oil that is added to said viscose solution in an aqueous emulsion thereof.

2. A regenerated cellulosic tubing said tubing being characterized in that it has between about 0.1 percent and 2.5 percent by weight based on the dry weight of cellulose of a softening anti-block additive homogeneously incorporated in its wall said additive consisting essentially of castor oil.

3. The regenerated cellulosic tubing of claim 2 which is a dialysis membrane and wherein the amount of additive incorporated in the wall thereof does not substantially change the permeability characteristics of said membrane.

* * * * *